(12) United States Patent
Iwasaki et al.

(10) Patent No.: US 11,021,625 B2
(45) Date of Patent: Jun. 1, 2021

(54) INK, METHOD OF MANUFACTURING ACRYLIC RESIN PARTICLE, PRINTING METHOD, INK ACCOMMODATING UNIT, AND INKJET PRINTING DEVICE

(71) Applicants: Ryota Iwasaki, Kanagawa (JP); Ryo Miyakoshi, Kanagawa (JP); Yuya Hirokawa, Kanagawa (JP)

(72) Inventors: Ryota Iwasaki, Kanagawa (JP); Ryo Miyakoshi, Kanagawa (JP); Yuya Hirokawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/452,847

(22) Filed: Jun. 26, 2019

(65) Prior Publication Data

US 2020/0002558 A1 Jan. 2, 2020

(30) Foreign Application Priority Data

Jun. 27, 2018 (JP) .............................. JP2018-122036
Mar. 15, 2019 (JP) .............................. JP2019-048281

(51) Int. Cl.
*C09D 11/36* (2014.01)
*B41J 11/00* (2006.01)
(Continued)

(52) U.S. Cl.
CPC ............. *C09D 11/36* (2013.01); *B41J 11/002* (2013.01); *B41M 5/0023* (2013.01);
(Continued)

(58) Field of Classification Search
CPC ....... B41J 2/01; B41J 2/211; B41J 2/17; B41J 2/17593; B41J 2/2107; B41J 2/1755;
(Continued)

(56) References Cited

U.S. PATENT DOCUMENTS 5,698,361 A * 12/1997 Aoshima ............... G03F 7/0212
430/176
6,426,375 B1 * 7/2002 Kubota .................. B41J 2/2114
347/106
(Continued)

FOREIGN PATENT DOCUMENTS

EP 2 657 306 A1 10/2013
JP 2004-131586 4/2004
(Continued)

OTHER PUBLICATIONS

BASF JONCRYL® 538 an acrylic polymer emulsion general information (pp. 1-4; printed publication date Jan. 1, 2007). (Year: 2007).*
(Continued)

*Primary Examiner* — Manish S Shah
(74) *Attorney, Agent, or Firm* — Oblon, McClelland, Maier & Neustadt, L.L.P.

(57) ABSTRACT

An ink includes a coloring material, an acrylic resin particle, an organic solvent, and water, wherein a solid dry film of the ink has a breaking elongation ratio of 50 percent or more, a storage elastic modulus G' of $1.0 \times 10^6$ Pa or more at 50 degrees C., and a swelling ratio of 40 percent or less to ethylacetate.

13 Claims, 1 Drawing Sheet

(51) Int. Cl.
  *B41M 5/00* (2006.01)
  *C08F 212/08* (2006.01)
  *C08F 220/12* (2006.01)
  *C09D 11/033* (2014.01)
  *C09D 11/107* (2014.01)

(52) U.S. Cl.
  CPC .......... *C08F 212/08* (2013.01); *C08F 220/12* (2013.01); *C09D 11/033* (2013.01); *C09D 11/107* (2013.01); *C08F 2800/20* (2013.01)

(58) Field of Classification Search
  CPC ...... B41J 2/2114; B41J 2/2117; B41J 2/2056; B41J 2/0057; B41J 3/60; B41J 2002/012; B41J 2/04598; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/175; B41J 2/17563; B41J 2/04588; B41J 2/04595; B41J 2/04586; B41J 2/14274; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
  See application file for complete search history.

(56) References Cited

U.S. PATENT DOCUMENTS

| | | | |
|---|---|---|---|
| 2004/0214920 A1* | 10/2004 | Aoshima | C09D 11/326 523/160 |
| 2006/0116440 A1* | 6/2006 | Aoshima | C09D 11/36 523/160 |
| 2006/0116441 A1* | 6/2006 | Aoshima | C09D 7/80 523/160 |
| 2007/0149647 A1* | 6/2007 | Yoshida | C09D 11/30 523/160 |
| 2007/0225401 A1* | 9/2007 | Sarkisian | C09D 11/30 523/160 |
| 2008/0152877 A1* | 6/2008 | Mukai | C09D 11/30 428/195.1 |
| 2011/0071250 A1* | 3/2011 | Naruse | C09D 11/326 524/556 |
| 2011/0234688 A1* | 9/2011 | Ikoshi | C09D 11/322 347/21 |
| 2012/0249705 A1* | 10/2012 | Aoki | B41M 5/0011 347/102 |
| 2013/0286084 A1* | 10/2013 | Aoyama | C09D 11/38 347/20 |
| 2017/0342288 A1 | 11/2017 | Kitade et al. | |
| 2018/0030292 A1 | 2/2018 | Gotou et al. | |

FOREIGN PATENT DOCUMENTS

| | | |
|---|---|---|
| JP | 2010-024352 | 2/2010 |
| JP | 2010-280830 | 12/2010 |
| JP | 5863327 B2 | 2/2016 |
| JP | 2016-108546 | 6/2016 |
| JP | 2017-039879 | 2/2017 |
| JP | 2017-155156 | 9/2017 |

OTHER PUBLICATIONS

Extended European Search Report dated Nov. 26, 2019 in Patent Application No. 19182439.0, 8 pages.

* cited by examiner

INK, METHOD OF MANUFACTURING ACRYLIC RESIN PARTICLE, PRINTING METHOD, INK ACCOMMODATING UNIT, AND INKJET PRINTING DEVICE

CROSS-REFERENCE TO RELATED APPLICATIONS

This patent application is based on and claims priority pursuant to 35 U.S.C. § 119 to Japanese Patent Application Nos. 2018-122036 and 2019-048281, filed on Jun. 27, 2018 and Mar. 15, 2019, respectively, in the Japan Patent Office, the entire disclosures of which are hereby incorporated by reference herein.

BACKGROUND

Technical Field

The present disclosure relates to an ink, a method of manufacturing an acrylic resin particle, a printing method, an ink accommodating unit, and an inkjet printing device.

Description of the Related Art

In an inkjet recording method, a small amount of ink droplets are discharged from a fine nozzle and attached to a recording medium, typically paper, to record texts and images thereon. This method enjoys low noise, simple process, and easy colorization. Also, as an advantage, plain paper can be used as the recording medium. Therefore, it is widely used as an output device in offices and home.

In addition, since the inkjet recording method has advantages of operating with variable printing and a variety of recording media, it is also widely chosen for commercial printing.

In commercial printing, the need for printing on coated paper is increasing. However, it is difficult to firmly fix a pigment on a low permeable medium such as coated paper, which leads to deterioration of image fixability.

SUMMARY

According to embodiments of the present disclosure, provided is an ink which contains a coloring material, an acrylic resin particle, an organic solvent, and water, wherein a solid dry film of the ink has a breaking elongation ratio of 50 percent or more, a storage elastic modulus G' of $1.0 \times 10^6$ Pa or more at 50 degrees C., and a swelling ratio of 40 percent or less to ethylacetate.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF THE EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Moreover, image forming, recording, printing, modeling, etc., in the present disclosure represent the same meaning, unless otherwise specified.

Embodiments of the present invention are described in detail below with reference to accompanying drawing(s). In describing embodiments illustrated in the drawing(s), specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

A method of adding a resin to ink has been proposed.

In addition, a coloring film striking a balance between light resistance and abrasion resistance has been proposed in aqueous pigment dispersion containing a pigment, a (meth) acrylic acid ester resin, and a polyurethane resin.

Further, a method of manufacturing a resin emulsion for paint that can improve the mechanical strength of an obtained film, thereby having excellent abrasion resistance, alkali resistance, cleaning resistance, attachability, and durability, has been proposed.

According to the present disclosure, an ink is provided which has excellent abrasion resistance, blocking resistance, and storage stability.

The present disclosure relates to the ink of the following 1 and also includes the following 2 to 10 as embodiments.

1. An ink contains a coloring material, an acrylic resin particle, an organic solvent, and water, wherein a solid dry film of the ink has a breaking elongation ratio of 50 percent or more, a storage elastic modulus G' of $1.0 \times 10^6$ Pa or more at 50 degrees C., and a swelling ratio of 40 percent or less to ethylacetate.

2. The ink according to 1 mentioned above, wherein the acrylic resin particle contains a first structure unit A represented by the following Chemical structure 1, a second structure unit B represented by the following Chemical formula 1, and a third structure unit C represented by the following Chemical structure 2.

Chemical structure 1

Chemical formula 1

In Chemical formula 1, R represents a hydrogen atom or a methyl group, A represents a linear alkyl group having 1 to 10 carbon atoms and preferably a linear alkyl group having 1 to 5 carbon atoms.

Chemical structure 2

In Chemical structure 2, B represents —CH$_2$CH(CH$_2$CH$_3$)CH$_2$CH$_2$CH$_2$CH$_3$.

3. The ink according to 2 mentioned above, wherein the acrylic resin particle contains the first structure unit A in an amount of from 40 to 60 percent by mass, the second structure unit B in an amount of from 20 to 30 percent by mass, and the third structure unit C in an amount of from 10 to 40 percent by mass, wherein the mass ratio of the first structure unit A to the second structure unit B is from 2 to 3.

4. The ink according to any one of 1 to 3 mentioned above, wherein the organic solvent contains 1,2-hexane diol or 1,2-propane diol.

5. The ink according to 4 mentioned above, wherein the organic solvent contains 1,2-hexane diol and one member selected from the group consisting of 1,2-propane diol, 1,3-butane diol, and 1,3-propane diol.

6. A method of manufacturing the acrylic resin particle in the ink of 2 or 3 mentioned above, contains reacting styrene as a monomer A forming the first structure unit A, (meth)acrylate as a monomer B forming the second structure unit B, and 2-ethylhexyl acrylate as a monomer C forming the third structure unit C.

Chemical structure 1

Chemical formula 1

Chemical structure 2

7. A printing method includes attaching the ink of any one of 1 to 5 mentioned above to a recording medium and drying the recording medium to which the ink has been attached at 100 degrees C. or higher.

8. The printing method according to 7 mentioned above, wherein the ink is discharged in the attaching.

9. An ink accommodating unit contains a container and the ink of any one of 1 to 5 mentioned above contained in the container.

10. An inkjet printing device contains a discharging device configured to discharge an ink and the ink accommodating unit of 9 mentioned above.

The solid dry film of the ink of the present disclosure has a breaking elongation ratio of 50 percent or more and preferably from 50 to 400 percent. Abrasion resistance is excellent when the breaking elongation ratio is 50 percent or more. Moreover, blocking resistance is excellent when the ratio is 400 percent or less.

Also, the storage elastic modulus G' at 50 degrees C. is $1.0 \times 10^6$ Pa or more, and preferably from $1.0 \times 10^6$ to $1.0 \times 10^8$ Pa. When the storage elastic modulus G' is $1.0 \times 10^6$ or more, blocking resistance is excellent. When the storage elastic modulus G' is $1.0 \times 10^8$ Pa or less, abrasion resistance is excellent.

When the swelling ratio of the ink to ethyl acetate is 40 percent or less, storage stability is excellent. Low swelling ratio is preferable to obtain excellent image fixability. In terms of storage stability and image fixability, the swelling ratio is preferably 40 percent or less, and the range of from 5 to 40 percent is practically particularly preferable.

It has been difficult to strike a good balance between these three physical property values at the same time. In particular, there is a trade-off relationship between the breaking elongation ratio and storage elastic modulus. That is, it is possible to achieve one of the two but difficult to satisfy both.

The present inventors have checked that, after inexpensive acrylic resin particles are selected to improve image fixability, how the composition and the amount of monomers constituting the acrylic resin particle have impacts on abrasion resistance, blocking resistance, and storage stability.

As a result, the present inventors have found that (meth)acrylic acid ester and 2-ethylhexyl acrylate used as the monomers constituting the acrylic resin particle strike a balance between blocking resistance and abrasion resistance.

This is based on the knowledge that (meth)acrylic acid increases the storage elastic modulus G' of a dried ink image and reduces tackiness and 2-ethylhexyl acrylate enhances breaking elongation ratio.

That is, the storage elastic modulus can be enhanced as the proportion of (meth)acrylic acid ester increases, thereby improving abrasion resistance. However, this decreases breaking elongation ratio, thereby degrading abrasion resistance.

In addition, as the proportion of 2-ethylhexyl acrylate increases, the breaking elongation ratio increases, thereby ameliorating abrasion resistance. However, this generally decreases storage elastic modulus, thereby degrading blocking resistance.

It is also found that due to the adjustment between (meth)acrylic acid ester and 2-ethylhexyl acrylate, it is possible to strike a balance between abrasion resistance and blocking resistance. However, this also degrades storage stability at the same time.

Therefore, in an attempt to solve this, styrene is added to the monomers constituting the acrylic resin particle to review the composition ratio, thereby obtaining an ink having a good solvent resistance and striking a balance between breaking elongation ratio, storage elastic modulus, and swelling ration without impairing storage stability, thus achieving a high level of abrasion resistance, blocking resistance, and storage stability at the same time. The present disclosure was thus made.

In the present disclosure, the breaking elongation ratio of dried solid film of the ink, the storage elastic modulus G' at 50 degrees C., and the swelling ratio to ethylacetate are measured for the ink film obtained in the following manner.

The method of preparing the ink film: ink is dripped and dried in a thermostatic chamber under a reduced pressure at 60 degrees C. for 48 hours and thereafter dried under a reduced pressure at 100 degrees C. for 6 hours to obtain an ink film.

In addition, the ink film has an average thickness of 1 mm at measuring the breaking elongation ratio and swelling ratio and an average thickness of 0.3 mm at measuring the storage elastic modulus. When preparing an ink film, the amount of dripping ink is increased or decreased to obtain an ink film having a target thickness. The average thickness is defined as the average of the values measured at 10 different positions.

Breaking Elongation Ratio

The breaking elongation ratio of ink can be obtained as follows.

Ink is dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 1 mm.

The obtained ink film is subjected to a tensile test by the following device under the following conditions. The breaking elongation ratio at 25 degrees C. is obtained according to the following relationship 1 and evaluated according to the following evaluation criteria.

Breaking elongation ratio=[(length after tension test−length before tension test)/(length before tension test)]×100    Relationship 1

Tension tester: AUTOGRAPH AGS-5kNX (manufactured by Shimadzu Corporation)
Tensing speed: 20 mm/min
Temperature: 25 degrees C.
Sample: JIS K6251 dumbbell-like form (No. 6)

Storage Elastic Modulus

The storage G' can be measured under the following conditions.

Ink is dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 0.3 mm.

The manufactured ink film is cut into a size of about 30 mm in length and about 10 mm in width. Thereafter, the ink film is measured by using ARES-G2 (manufactured by TA Instruments) with a freezer. After the sample of the ink film is set in the device at 20 degrees C. using a torsion solid clamp as a jig for fixing a sample, the sample is cooled down to −60 degrees C. under an auto tension of 2 g. 10 minutes after the temperature reaches −60 degrees, the sample is measured under the following conditions. The storage elastic modulus at 50 degrees C. is defined as G' based on the obtained measuring data.

Measuring mode: temperature sweep
Measuring range of temperature: −60 to 100 degrees C.
Temperature rising speed: 5 degrees C./min
Frequency: 1 Hz
Initial distortion: 0.1 percent
Autotension: 2 g Swelling Ratio The swelling ratio is measured by the following method.

Ink is dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 1 mm.

After the thus-obtained ink film is cut into a size of 5 mm square, the mass is measured. The cut ink film was put into a 5 mL glass bottle. Thereafter, 1 g of ethyl acetate (manufactured by Yamaichi Chemical Industries Co., Ltd.) is further added to immerse the ink film therein. The ink film is left undone in a sealed state at 25 degrees C. for 24 hours.

Thereafter, the ink film is taken out of the glass bottle and ethyl acetate (manufactured by Yamaichi Chemical Industries Co., Ltd.) on the surface of the ink film is wiped using Kimwipe (manufactured by Nippon Paper Industries Co., Ltd.) to such an extent that it cannot be visually confirmed. The mass of the ink film is measured and the swelling ratio is calculated from the following relationship 2.

Swelling ratio(percent)=100×[(B−A)/A]    Relationship 2

In Relationship 2, A represents the mass of the ink film before the immersion and B represents the mass of the ink film after the immersion.

Acrylic Resin Particle

The acrylic resin particle for use in the present disclosure preferably contains a first structure unit A represented by the following Chemical structure 1, a second structure unit B represented by the following Chemical formula 1, and a third structure unit C represented by the following Chemical structure 2.

Chemical structure 1

Chemical formula 1

In Chemical formula 1, R represents a hydrogen atom or a methyl group, A represents a linear alkyl group having 1 to 10 carbon atoms and preferably a linear alkyl group having 1 to 5 carbon atoms.

Chemical structure 2

In Chemical structure 2, B represents —CH$_2$CH (CH$_2$CH$_3$)CH$_2$CH$_2$CH$_2$CH$_3$.

It is preferable to react styrene as the monomer A forming the first structure unit A, (meth)acrylic acid ester as the monomer B forming the second structure unit B, and 2-ethylhexyl acrylate as the monomer C forming the third structure unit C to obtain the acrylic resin particle.

Specific examples of the (meth)acrylic acid ester of the monomer B forming the second structure unit B include, but are not limited to, methyl(meth)acrylate, ethyl(meth)acrylate, propyl(meth)acrylate, and n-butyl(meth)acrylate. As the second structure unit B represented by Chemical formula 1, R is preferably a methyl group.

Specific examples include, but are not limited to, methylmethacrylate, ethymethacrylate, propylmethacrylate, and n-butylmethacrylate.

It is preferable that the acrylic resin particle contains the first structure unit A in an amount of from 40 to 60 percent by mass, the second structure unit B in an amount of 20 to 30 percent by mass, and the third structure unit C in an amount of from 10 to 40 percent by mass. Moreover, the mass ratio of the first structure unit A to the second structure unit B is preferably from 2 to 3.

When the mass proportion of the first structure unit A is 40 percent by mass or more, blocking resistance is excellent. When it is 60 percent by mass or less, abrasion resistance is preferably improved. When the mass proportion of the second structure unit B is 20 percent by mass or more, blocking resistance is excellent. When it is 30 percent by mass or less, abrasion resistance and storage stability are preferably improved. When the mass proportion of the third structure unit C is 10 percent by mass or more, blocking resistance is excellent. When it is 40 percent by mass or less, blocking resistance is preferably improved. When the mass ratio of first structure unit A to second structure unit B is from 2 to 3, storage stability can be preferably improved while improving the blocking resistance.

The structure of the acrylic resin contained in the ink and the ratio therein can be determined by, for example, identifying the constituents of the monomer by Gas Chromatography-Mass Spectrometry (GC-MASS) and separating the peaks derived from the individual monomers by Nuclear Magnetic Resonance (NMR).

It is preferable to react styrene as the monomer A forming the first structure unit A represented by Chemical structure 1, (meth)acrylate as the monomer B forming the second structure unit B represented by Chemical structure 1, and acrylic acid 2-ethylhexyl ester monomer as the monomer C forming the third structure unit C represented by Chemical structure 2 to manufacture the acrylic resin particle having the first structure unit A represented by Chemical structure 1, the second structure unit B represented by Chemical formula 1, and the third structure unit C represented by Chemical structure 2.

The acrylic resin particle is preferably obtained by polymerizing the first monomer A that introduces the first structure unit A represented by Chemical structure 1 into the acrylic resin particle in an addition amount of from 40 to 60 percent by mass, the second monomer B that introduces the second structure unit B represented by Chemical formula 1 into the acrylic resin particle in an addition amount of from 20 to 30 percent by mass, the third monomer C that introduces the third structure unit C represented by Chemical structure 2 into the acrylic resin particle in an addition amount of from 10 to 40 percent by mass. In addition, the addition amount mass ratio of the structure unit A to the structure unit B is preferably from 2 to 3.

The acrylic resin particle may be used alone or in combination of a plurality of acrylic resin particles having different structures and properties. It is possible to mix a resin emulsion in which the acrylic resin particle is dispersed in a liquid component such as water with materials such as a coloring material and an organic solvent to obtain an ink. It is possible to use suitably-synthesized acrylic resin particle as the acrylic resin particle. Alternatively, the resin particle available on the market can be used. The acrylic resin particle may be used in combination with other resin particles.

The volume average particle diameter of the resin particle is not particularly limited and can be suitably selected to suit to a particular application. The volume average particle diameter is preferably from 10 to 1,000 nm, more preferably from 10 to 200 nm, and furthermore preferably from 10 to 100 nm to obtain good fixability and image robustness.

The volume average particle diameter can be measured by using, for example, a particle size analyzer (Nanotrac Wave-UT151, manufactured by MicrotracBEL Corp.).

The proportion of the resin in the ink is not particularly limited and can be suitably selected to suit to a particular application. In terms of fixability and storage stability of ink, it is preferably from 1 to 30 percent by mass and more preferably from 5 to 20 percent by mass to the total amount of the ink.

When the acrylic resin particle and other resin particles are used in combination, the proportion of the acrylic resin particle is preferably from 80 to 100 percent by mass when the total amount of the resin particles is 100 percent by mass.

Ink

Hereinafter, organic solvents, water, coloring materials, additives, etc., constituting the ink of the present disclosure other than the resin particle mentioned above will be described.

Coloring Material

The coloring material used in the present disclosure is a pigment. As the pigment, inorganic pigments or organic pigments can be used. These can be used alone or in combination. In addition, it is possible to use a mixed crystal.

As the pigments, for example, black pigments, yellow pigments, magenta pigments, cyan pigments, white pigments, green pigments, orange pigments, and gloss pigments and metallic pigments of gold, silver, etc., can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black can be used. Of those pigments, pigments having good affinity with solvents are preferable. Also, hollow resin particles and hollow inorganic particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4, (Phthalocyanine Blue), 16, 17:1, 56, 60, and 63; C.I. Pigment Green 1, 4, 7, 8, 10, 17, 18, and 36.

The proportion of the coloring material in the ink is preferably from 0.1 to 15 percent by mass and more preferably from 1 to 10 percent by mass in terms of enhancement of image density, fixability, and discharging stability.

To obtain an ink by pigment dispersion, for example, a hydrophilic functional group is introduced into a pigment to prepare a self-dispersible pigment, the surface of a pigment is coated with a resin followed by dispersion, or a dispersant is used to disperse a pigment.

To prepare a self-dispersible pigment by introducing a hydrophilic functional group into a pigment, for example, it is possible to add a functional group such as a sulfone group and a carboxyl group to the pigment (e.g., carbon) to disperse the pigment in water.

To coat the surface of a pigment with a resin, the pigment is encapsulated by microcapsules to make the pigment dispersible in water. This can be referred to as a resin-coated pigment. In this case, all the pigments to be added to ink are not necessarily entirely coated with a resin. Pigments partially or wholly uncovered with a resin are allowed to be dispersed in the ink unless such pigments have an adverse impact.

In a method of using a dispersant to disperse a pigment, for example, a known dispersant having a small molecular weight or a large molecular weight, which is represented by a surfactant, is used to disperse the pigment in ink.

As the dispersant, it is possible to use, for example, an anionic surfactant, a cationic surfactant, a nonionic surfactant, an amphoteric surfactant, etc. depending on a pigment.

Also, a nonionic surfactant (RT-100, manufactured by TAKEMOTO OIL & FAT CO., LTD.) and a formalin condensate of naphthalene sodium sulfonate are suitable as the dispersant.

Those can be used alone or in combination.

Pigment Dispersion

The ink can be obtained by mixing a pigment with materials such as water and an organic solvent. It is also possible to mix the pigment with water, a dispersant, etc., to prepare a pigment dispersion and thereafter mix the pigment dispersion with material such as water and an organic solvent to manufacture the ink.

The pigment dispersion is obtained by mixing and dispersing water, a pigment, a pigment dispersant, and other optional components and controlling the particle size. It is good to use a dispersing device for dispersion.

The particle diameter of the pigment in the pigment dispersion has no particular limit. For example, the maximum frequency is preferably from 20 to 500 nm and more preferably from 20 to 150 nm in the maximum number conversion to improve dispersion stability of the pigment and ameliorate discharging stability and the image quality such as image density. The particle diameter of the pigment can be measured using a particle size analyzer (Nanotrac Wave-UT151, manufactured by MicrotracBEL Corp).

In addition, the proportion of the pigment in the pigment dispersion is not particularly limited and can be suitably selected to suit a particular application. In terms of improving discharging stability and image density, the proportion is preferably from 0.1 to 50 percent by mass and more preferably from 0.1 to 30 percent by mass.

It is preferable that the pigment dispersion be filtered with a filter, a centrifuge, etc. to remove coarse particles followed by degassing.

Organic Solvent

There is no specific limitation to the organic solvent for use in the present disclosure. For example, water-soluble organic solvents can be used. Examples include, but are not limited to, polyols, ethers such as polyol alkylethers and polyol arylethers, nitrogen-containing heterocyclic compounds, amides, amines, and sulfur-containing compounds.

Specific examples include, but are not limited to, polyols such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butane diol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butane triol, 1,2,3-butanetriol, 2,2,4-trimethyl-1,3-pentanediol, and petriol; polyol alkylethers such as ethylene glycol monoethylether, ethylene glycol monobutylether, diethylene glycol monomethylether, diethylene glycol monoethylether, diethylene glycol monobutylether, tetraethylene glycol monomethylether, and propylene glycol monoethylether; polyol arylethers such as ethylene glycol monophenylether and ethylene glycol monobenzylether; nitrogen-containing heterocyclic compounds such as 2-pyrolidone, N-methyl-2-pyrolidone, N-hydroxyethyl-2-pyrolidone, 1,3-dimethyl-2-imidazolidinone, ε-caprolactam, and γ-butyrolactone; amides such as formamide, N-methylformamide, N,N-dimethylformamide, 3-methoxy-N,N-dimethyl propionamide, and 3-butoxy-N,N-dimethyl propionamide; amines such as monoethanolamine, diethanolamine, and triethylamine; sulfur-containing compounds such as dimethyl sulfoxide, sulfolane, and thiodiethanol; propylene carbonate, and ethylene carbonate.

To serve as a humectant and impart a good drying property, it is preferable to use an organic solvent having a boiling point of 250 degrees C. or lower.

Polyol compounds having eight or more carbon atoms and glycol ether compounds are also suitable.

Specific examples of the polyol compounds having eight or more carbon atoms include, but are not limited to, 2-ethyl-1,3-hexanediol and 2,2,4-trimethyl-1,3-pentanediol.

Specific examples of the glycolether compounds include, but are not limited to, polyol alkyl ethers such as ethyl eneglycol monoethylether, ethyl eneglycol monobutylether, diethyleneglycol monomethylether, diethyleneglycol monoethylether, diethyleneglycol monobutylether, tetraethyleneglycol monomethylether, and propyleneglycol monoethylether; and polyol arylethers such as ethyleneglycol monophenylether and ethyleneglycol monobenzylether.

The polyhydric alcohol compounds having eight or more carbon atoms and glycolether compounds enhance permeability of ink for paper used as a recording medium.

Properties such as elongation may vary depending on the type of organic solvents contained in the ink.

It is preferable to contain 1,2-hexanediol or 1,2-propanediol as the organic solvent. Of the organic solvents, 1,2-hexanediol or 1,2-propanediol is excellent to ameliorate storage stability and demonstrates good wet-spreading on a printing medium, which leads to good coloring.

It is preferable to contain 1,2-hexane diol and preferably one member selected from the group consisting of 1,2-propane diol, 1,3-butane diol, and 1,3-propane diol.

The proportion of the organic solvent in the ink has no particular limit and can be suitably selected to suit to a particular application.

In terms of drying property and discharging reliability of the ink, the proportion is preferably from 10 to 60 percent by mass and more preferably from 20 to 60 percent by mass.

Water

The proportion of water in the ink is not particularly limited and can be suitably selected to suit to a particular application. For example, in terms of the drying property and discharging reliability of the ink, the proportion is preferably from 10 to 90 percent by mass and more preferably from 20 to 60 percent by mass.

The particle diameter of the solid portion in the ink has no particular limit and can be suitably selected to suit to a particular application. For example, the maximum frequency in the maximum number conversion is preferably from 20 to 1,000 nm and more preferably from 20 to 150 nm to ameliorate the discharging stability and image quality such as image density. The solid portion includes resin particulate, pigment particulate, etc. The particle diameter can be measured by using a particle size analyzer (Nanotrac Wave-UT151, manufactured by MicrotracBEL Corp).

Additive

The ink may further optionally include a surfactant, a defoaming agent, a preservative and fungicide, a corrosion inhibitor, a pH regulator, etc.

Surfactant

Examples of the surfactant include, but are not limited to, silicone-based surfactants, fluorochemical surfactants, amphoteric surfactants, nonionic surfactants, and anionic surfactants.

The silicone-based surfactant has no specific limit and can be suitably selected to suit to a particular application. Of these, preferred are silicone-based surfactants which are not decomposed even in a high pH environment.

Specific examples include, but are not limited to, side-chain-modified polydimethylsiloxane, both-distal-end-modified polydimethylsiloxane, one-distal-end-modified polydimethylsiloxane, and side-chain-both-distal-end-modified polydimethylsiloxane. A silicone-based surfactant having a polyoxyethylene group or a polyoxypropylene group as a modification group is particularly preferable because such an agent demonstrates good properties as an aqueous surfactant. It is possible to use a polyether-modified silicone-based surfactant as the silicone-based surfactant. A specific example is a compound in which a polyalkylene oxide structure is introduced into the side chain of the Si site of dimethyl siloxane.

Specific examples of the fluorochemical surfactant include, but are not limited to, perfluoroalkyl sulfonic acid compounds, perfluoroalkyl carboxylic acid compounds, ester compounds of perfluoroalkyl phosphoric acid, adducts of perfluoroalkyl ethylene oxide, and polyoxyalkylene ether polymer compounds having a perfluoroalkyl ether group in its side chain. These are particularly preferable because the fluorochemical surfactant does not easily produce foams.

Specific examples of the perfluoroalkyl sulfonic acid compounds include, but are not limited to, perfluoroalkyl sulfonic acid and salts of perfluoroalkyl sulfonic acid.

Specific examples of the perfluoroalkyl carboxylic acid compounds include, but are not limited to, perfluoroalkyl carboxylic acid and salts of perfluoroalkyl carboxylic acid.

Specific examples of the polyoxyalkylene ether polymer compounds having a perfluoroalkyl ether group in its side chain include, but are not limited to, salts of sulfuric acid ester of polyoxyalkylene ether polymer having a perfluoroalkyl ether group in its side chain and salts of polyoxyalkylene ether polymers having a perfluoroalkyl ether group in its side chain. Specific examples of the counter ion of the salt of these fluorochemical surfactants include, but are not limited to, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides.

Specific examples of the anionic surfactants include, but are not limited to, polyoxyethylene alkyl ether acetates, dodecyl benzene sulfonates, laurates, and polyoxyethylene alkyl ether sulfates.

These can be used alone or in combination.

The proportion of the surfactant in the ink is not particularly limited and can be suitably selected to suit to a particular application. For example, the proportion is preferably from 0.001 to 5 percent by mass and more preferably from 0.05 to 5 percent by mass in terms of excellent wettability and discharging stability and improvement on image quality.

Defoaming Agent

The defoaming agent has no particular limit. For example, silicon-based defoaming agents, polyether-based defoaming agents, and aliphatic acid ester-based defoaming agents are suitable. These can be used alone or in combination. Of these, silicone-based defoaming agents are preferable in terms of the effect of foam breaking.

Preservatives and Fungicides

The preservatives and fungicides are not particularly limited. A specific example is 1,2-benzisothiazoline-3-one.

Corrosion Inhibitor

The corrosion inhibitor has no particular limitation. Specific examples include, but are not limited to, acid sulfites and sodium thiosulfates.

pH Regulator

The pH regulator has no particular limit as long as it can control pH to not lower than 7. Specific examples include, but are not limited to, amines such as diethanol amine and triethanol amine.

Properties of the ink are not particularly limited and can be suitably selected to suit to a particular application. For example, viscosity, surface tension, and pH are preferably in the following ranges.

Viscosity of the ink at 25 degrees C. is preferably from 5 to 30 mPa·s and more preferably from 5 to 25 mPa·s to improve print density and text quality and obtain good dischargeability. Viscosity can be measured by, for example, a rotatory viscometer (RE-80L, manufactured by TOKI SANGYO CO LTD.). The measuring conditions are as follows:

Standard cone rotor (1° 34'×R24)
Sample liquid amount: 1.2 mL
Rotational frequency: 50 rotations per minute (rpm)
25 degrees C.
Measuring time: three minutes.

The surface tension of the ink is preferably 35 mN/m or less and more preferably 32 mN/m or less at 25 degrees C. in terms that the ink is suitably leveled on a recording medium and the drying time of the ink is shortened.

pH of the ink is preferably from 7 to 12 and more preferably from 8 to 11 in terms of prevention of corrosion of metal material in contact with liquid.

Recording Medium

The recording medium for use in recording is not particularly limited.

Specific examples include, but are not limited to, plain paper, gloss paper, special paper, cloth, film, transparent sheets, and printing paper for general purposes.

Recorded Matter

The ink recorded matter of the present disclosure includes a recording medium and an image formed on the recording medium with the ink of the present disclosure.

The recorded matter is obtained by an inkjet recording device executing an inkjet recording method.

Ink Accommodating Unit

The ink accommodating unit of the present disclosure includes a container to accommodate the ink of the present disclosure. Furthermore, the ink accommodating unit contains the ink in the container (ink containing unit) and includes other optional members.

The container is not particularly limited. The form, the structure, the size, and the material thereof can be suitably determined to a particular application. For example, a container having at least an ink containing unit made of aluminum laminate film, a plastic film, etc., is suitable. For example, a main tank or an ink cartridge including the ink containing unit is suitable.

Recording Device and Recording Method

The ink of the present disclosure can be suitably applied to various recording devices employing an inkjet recording method, such as printers, facsimile machines, photocopiers, multifunction peripherals (serving as a printer, a facsimile machine, and a photocopier), and solid freeform fabrication devices (3D printers, additive manufacturing devices).

In the present disclosure, the recording device and the recording method respectively represent a device capable of discharging ink, various processing liquids, etc., to a recording medium and a method of recording utilizing the device. The recording medium means an article to which ink or various processing fluids can be temporarily or permanently attached.

The recording device includes a discharging device such as a discharging head to discharge the ink and may further optionally include a device relating to feeding, conveying, and ejecting a recording medium and other devices referred to as a pre-processing device, a post-processing device, etc.

The recording method preferably includes a heating and drying step of heating the recording medium to which the ink is attached at 100 degrees C. or higher. The heating temperature is preferably from 100 to 140 degrees C. Blocking resistance is excellent at 100 degrees C. or higher. Yellowing of paper as a recording medium can be prevented at 140 degrees C. or lower.

For example, the heating device and the drying device heat and dry the print surface and the opposite surface of a recording medium. The heating device and the drying device are not particularly limited. For example, a fan heater and an infra-red heater can be used. Heating and drying can be conducted before, in the middle of, or after printing.

In addition, the recording device and the recording method are not limited to those producing meaningful visible images such as texts and figures with ink. For example, the recording method and the recording device capable of producing patterns like geometric design and 3D images are included.

In addition, the recording device includes both a serial type device in which the discharging head is allowed to move and a line type device in which the liquid discharging head is not moved, unless otherwise specified.

Furthermore, in addition to the desktop type, this recording device includes a device capable of printing images on a wide recording medium such as A0 and a continuous printer capable of using continuous paper rolled up in a roll-like form as a recording medium.

Figure 1:
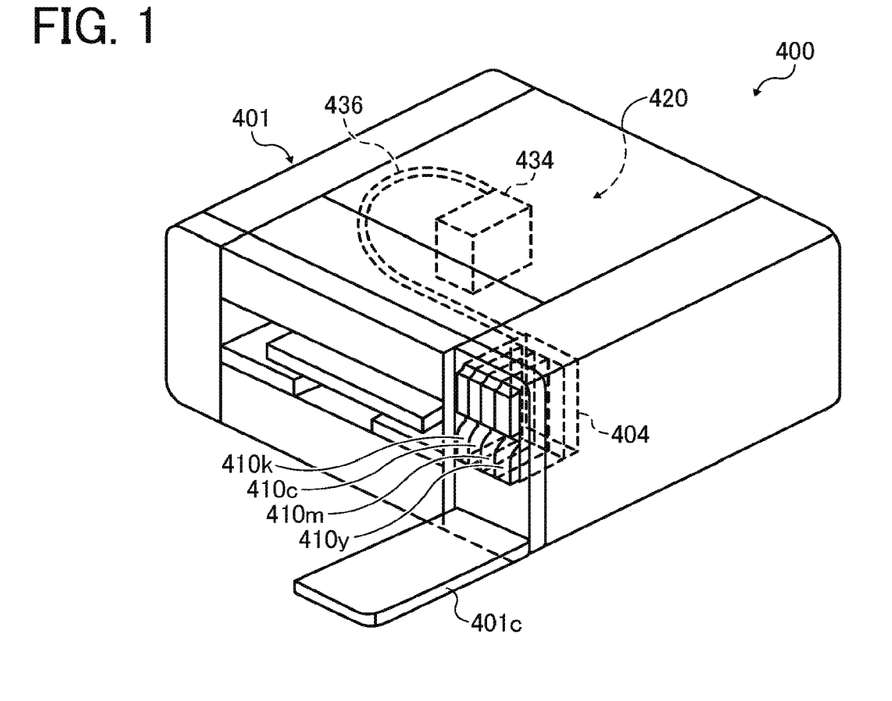
FIG. 1 is a diagram illustrating an example of the recording device using the ink according to an embodiment of the present disclosure.
Figure 2:
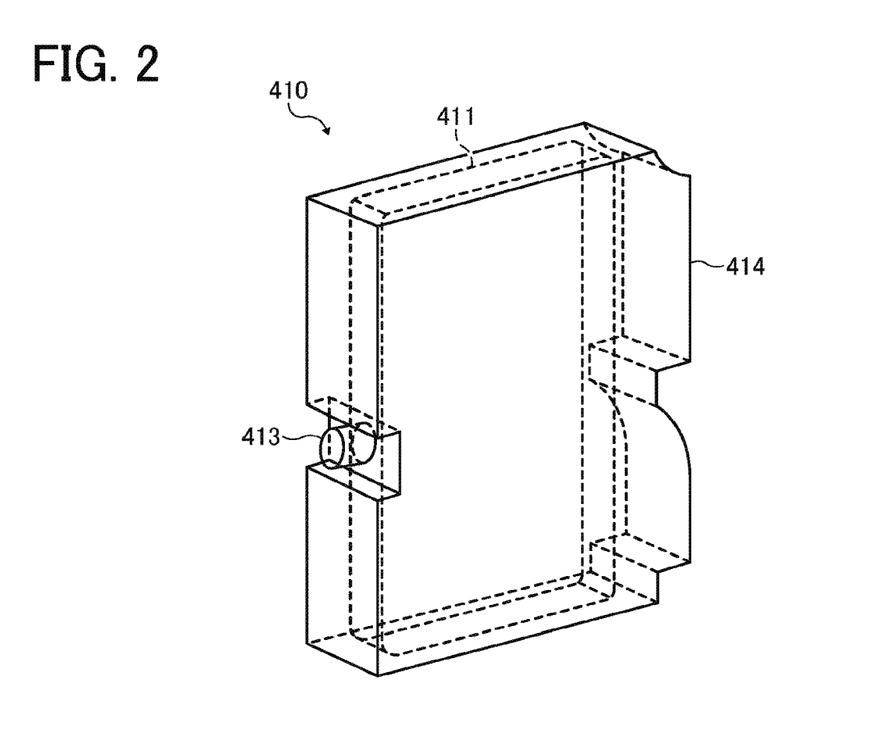
FIG. 2 is a diagram illustrating a perspective view of a main tank that accommodates the ink according to an embodiment of the present disclosure.

The recording device is described using an example with reference to FIG. 1 and

FIG. 2. FIG. 1 is a diagram illustrating a perspective view of the recording device. FIG. 2 is a diagram illustrating a perspective view of the main tank. An image forming device 400 as an embodiment of the recording device is a serial type image forming device. A mechanical assembly 420 is disposed in an exterior 401 of the image forming device 400. Each ink accommodating member (container) 411 of each main tank (ink accommodating unit) 410 (410k, 410c, 410m, and 410y) for each color of black (K), cyan (C), magenta (M), and yellow (Y) is made of, for example, a packaging member such as aluminum laminate film. The ink accommodating member 411 is housed in, for example, a plastic container housing unit 414. As a result, the main tank 410 is used as an ink cartridge of each color.

A cartridge holder 404 is disposed on the rear side of the opening appearing when a cover 401c is opened. The main tank 410 is detachably attached to the cartridge holder 404. This enables each ink outlet 413 of the main tank 410 to communicate with a discharging head 434 for each color via a supplying tube 436 for each color so as to discharge the ink from the discharging head 434 to a recording medium.

How to use the ink is not limited to the inkjet recording method.

Specific examples of such methods other than the inkjet recording method include, but are not limited to, blade coating methods, gravure coating methods, bar coating methods, roll coating methods, dip coating methods, curtain coating methods, slide coating methods, die coating methods, and spray coating methods.

Image forming, recording, printing, print, etc. in the present disclosure represent the same meaning.

Also, recording media, media, substrates in the present disclosure have the same meaning.

Having generally described preferred embodiments of this disclosure, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, embodiments of the present disclosure are described in detail with reference to Examples and Comparative Examples but are not limited thereto. In Examples, parts means parts by mass and percent means percent by mass excluding those in the evaluation criteria.

Preparation of Cyan Pigment Dispersion 90 g of Pigment Blue 15:4 (SMART Cyan 3154BA, manufactured by Sensient Technologies Corporation) was added to 3,000 mL of a 2.5 N (normal) aqueous solution of sodium hypochlorite followed by stirring at 60 degrees C. at 300 rpm to react for 10 hours for oxidization treatment.

The reaction liquid was filtrated and the thus-filtered cyan pigment was neutralized by sodium hydroxide solution followed by ultra-filtration.

Thereafter, the thus-obtained filtrate and deionized water were subject to ultrafiltration by dialysis membrane and ultrasonic dispersion to obtain cyan pigment dispersion having a pigment solid portion concentrated to 20 percent.

Preparation of Magenta Pigment Dispersion

A magenta pigment dispersion having a pigment solid portion of 20 percent was obtained in the same manner as in the preparation of cyan pigment dispersion except that Pigment Red 122 (Pigment Red 122, manufactured by Sun Chemical Corporation) was used instead of Pigment Blue 15:4.

Examples 1 to 8 and Comparative Examples 1 to 2

Preparation of Ink

Based on Ink Prescription Nos. 1 to 3 as shown in Table 1, the coloring material, acrylic resin particle emulsion, organic solvent, surfactant, and water were mixed and stirred, followed by filtration with a polypropylene filter of 0.2 µm to produce each ink.

The Ink Prescription No. of each ink and the composition of acrylic resin particle are shown in Table 2. The acrylic resin particle was obtained by the following preparation method.

The surfactants used in the prescription of the ink shown in Table 1 are as follows.
  Acetylene glycol-based surfactant (Surfynol 465, manufactured by Nisshin Chemical co., ltd.)
  Silicone-based surfactant (BYK-348, manufactured by BYK Chemie GmbH)

Preparation of Acrylic Resin Particle 900 g of deionized water and 1 g of sodium lauryl sulfate were charged in a reaction container equipped with a stirrer, a reflux condenser, a dripping device, and a thermometer and heated to 70 degrees C. while replacing nitrogen during stirring.

While maintaining the internal temperature at 70 degrees C., 4 g of potassium persulfate was added as a polymerization initiator to obtain a reaction solution. A total amount of 1,000 g of the compounds corresponding to the monomers A, B, and C shown in Table 2 was added according to the proportion shown in Table 2 to 450 g of deionized water and 3 g of sodium lauryl sulfate during stirring to preliminarily prepare an emulsion, which was continuously dripped to the reaction solution in four hours.

After dripping, the resultant was aged for three hours. After the thus-obtained aqueous emulsion was cooled down to room temperature, deionized water and sodium hydroxide aqueous solution were added to adjust pH of the solution to 8 to obtain an acrylic resin emulsion 1 (solid portion of 30 percent by mass).

Emulsions of acrylic resin particles 2 to 8 and emulsions of comparative acrylic resin particles 1 to 2 were prepared in the same manner as for the acrylic resin particle 1 except that the prescription described in Table 2 was used.

The thus-obtained ink was evaluated as follows.

Breaking Elongation Ratio

The breaking elongation ratio of the ink was obtained as follows.

The ink was dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 1 mm.

The obtained ink film was subjected to a tensile test by the following device under the following conditions. The breaking elongation ratio at 25 degrees C. is obtained according to the following relationship 1 and evaluated according to the following evaluation criteria. Breaking elongation ratio= [(length after tension test−length before tension test)/(length before tension test)]×100 Relationship 1

Tension tester: AUTOGRAPH AGS-5kNX (manufactured by Shimadzu Corporation)
  Tensing speed: 20 mm/min
  Temperature: 25 degrees C.
  Sample: JIS K6251 dumbbell-like form (No. 6)

Storage Elastic Modulus

The storage elastic modulus $G'$ was measured under the following conditions.

The ink was dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 0.3 mm.

The manufactured ink film was cut into a size of about 30 mm in length and about 10 mm in width. Thereafter, the ink film was measured by using ARES-G2 (manufactured by TA Instruments) with a freezer.

After the sample of the ink film was set in a device at 20 degrees C. using a torsion solid clamp as a jig for fixing a sample, the sample was cooled down to −60 degrees C. under an auto tension of 2 g.

10 minutes after the temperature reached −60 degrees, the sample was measured under the following conditions. The storage elastic modulus $G'$ at 50 degrees C. was obtained based on the obtained measuring data.
  Measuring mode: temperature sweep
  Measuring range of temperature: −60-100 degrees C.
  Temperature rising speed: 5 degrees C./min
  Frequency: 1 Hz
  Initial distortion: 0.1 percent
  Autotension: 2 g Swelling Ratio The swelling ratio was measured by the following method.

The ink was dripped onto a Teflon™ petri dish (diameter of 30 mm) and dried in a thermostatic chamber under a reduced pressure at 60 degrees C. for 48 hours and thereafter dried under a reduced pressure at 100 degrees C. for 6 hours to obtain an ink film having an average thickness of 1 mm.

After the thus-obtained ink film is cut into a size of 5 mm square, the mass is measured. The cut ink film was put into a 5 mL glass bottle. Thereafter, 1 g of ethyl acetate (manufactured by Yamaichi Chemical Industries Co., Ltd.) is further added to immerse the ink film therein. The ink film is left undone in a sealed state at 25 degrees C. for 24 hours.

Thereafter, the ink film is taken out of the glass bottle and ethyl acetate (manufactured by Yamaichi Chemical Industries Co., Ltd.) on the surface of the ink film is wiped using Kimwipe (manufactured by Nippon Paper Industries Co., Ltd.) to such an extent that it cannot be visually confirmed. The mass of the ink film is measured and the swelling ratio is calculated from the following relationship 2.

Swelling ratio(percent)=100×[(B−A)/A]    Relationship 2

In Relationship 2, A represents the mass of the ink film before the immersion and B represents the mass of the ink film after the immersion.

Evaluation 1 (Abrasion Resistance)

6 cm square solid image was printed on Lumi Art Gross (90 gms) with 100 duty using a printer (GXe 5500, manufactured by Ricoh Co., Ltd.) and, immediately thereafter, the solid image was dried at 100 degrees C. by a constant temperature dryer (OF-300B, manufactured by As One Corporation) for 180 seconds. The solid portion printed on the Lumi Art Gross (90 gms) mounted onto a clockmeter (manufactured by TOYO SEIKI KOGYO CO. LTD.) was reciprocated 10 times. The dirt adhering to the rubbed Lumi Art Groll (90 gsm) was measured by X-rite to evaluate according to the following criteria.

A: Transfer OD was less than 0.1
B: Transfer OD was from 0.1 to less than 0.20
C: Transfer OD was 0.20 or more Evaluation 2 (Blocking Resistance)

A solid portion of 6 cm square was printed on a recording medium using a printer (GXe 5500 manufactured by Ricoh Co., Ltd.), dried at 100 degrees C. for 180 seconds and thereafter overlapped with a blank (not printed on printing surface) recording medium (interleaf). This was held between two 10 cm square glass plates, which was left undone for 24 hours under a load of 0.5 kg/cm² applied to the glass plates from the above and left undone at 60 degrees C. and 70 percent RH for 24 hours. Thereafter, the degree of blocking was evaluated based on the following criteria.

A: No blocking occurred
B: Slight blocking occurred (slightly transferred to interleaf)
C: Blocking occurred (transferred portion clearly recognized on interleaf)

Evaluation 3 (Storage Stability)

Each ink was sealed and stored at 70 degrees C. for two weeks. Thereafter, viscosity before and after the storage was measured, and the viscosity change ratio was calculated according to the following relationship.

Viscosity change ratio(percent)=[{(viscosity after storage)−(viscosity before storage)}/(viscosity before storage)]×100

A: Viscosity change ratio was less than 3 percent
B: Viscosity change ratio was from 3 to less than 8 percent
C: Viscosity change ratio was 8 percent or higher

TABLE 1

|  |  | Ink Prescription No. | | |
| --- | --- | --- | --- | --- |
|  |  | 1 | 2 | 3 |
| Coloring material | Cyan pigment dispersion | 45 |  |  |
|  | Magenta pigment dispersion |  | 45 | 45 |
| Resin | Acrylic resin particle emulsion solid content) | 5 | 5 | 5 |
| Organic solvent | 1,2-hexane diol | 5 | 5 | 5 |
|  | 1,2-propanediol | 15 |  |  |
|  | 1,3-butane diol |  | 15 |  |
|  | 1,3-propanediol |  |  | 15 |
| Surfactant | Surfynol 465 | 2 |  |  |
|  | BYK348 |  | 2 | 2 |
|  | Deionized water | Balance | Balance | Balance |
|  | Total (percent) | 100 | 100 | 100 |

TABLE 2

|  |  | Example 1 | Example 2 | Example 3 | Example 4 | Example 5 | Example 6 |
| --- | --- | --- | --- | --- | --- | --- | --- |
| Ink | Ink prescription No. | 1 | 2 | 3 | 1 | 2 | 3 |
| Acrylic resin particle | Acrylic resin particle No. | 1 | 2 | 3 | 4 | 5 | 6 |
| Composition ratio (percent by mass) | Styrene | 60 | 50 | 40 | 60 | 40 | 20 |
|  | Methyl methacrylate | 20 |  | 20 |  | 40 |  |
|  | Ethyl methacrylate |  | 20 |  | 30 |  | 60 |
|  | Butyl acrylate |  |  |  |  |  |  |
|  | 2-ethylhexyl acrylate | 20 | 30 | 40 | 10 | 20 | 20 |
| Ink film | Breaking elongation ratio > 50 percent | 51 | 78 | 99 | 55 | 81 | 118 |
|  | Storage elastic modulus G' >1.0 (×10⁶ Pa) | 11 | 5.8 | 1.3 | 9.2 | 7.5 | 3.6 |

TABLE 2-continued

|  |  |  |  |  |  |  |  |
|---|---|---|---|---|---|---|---|
| Evaluation | Swelling ratio ≤ 40 percent | 6 | 30 | 32 | 5 | 13 | 26 |
|  | Abrasion resistance | A | A | A | A | A | A |
|  | Blocking resistance | A | A | A | A | A | A |
|  | Storage stability | A | A | A | A | B | B |

|  |  | Example 7 | Example 8 | Comparative Example 1 | Comparative Example 2 |
|---|---|---|---|---|---|
| Ink | Ink prescription No. | 1 | 1 | 2 | 3 |
| Acrylic resin particle | Acrylic resin particle No. | 7 | 8 | Comparison 1 | Comparison 2 |
| Composition ratio (percent by mass) | Styrene | 10 | 60 | 50 |  |
|  | Methyl methacrylate | 30 |  | 50 | 30 |
|  | Ethyl methacrylate |  |  |  |  |
|  | Butyl acrylate |  | 20 |  |  |
|  | 2-ethylhexyl acrylate | 60 | 20 |  | 70 |
| Ink film | Breaking elongation ratio > 50 percent | 210 | 51 | 22 | 54 |
|  | Storage elastic modulus G' >1.0 (×10$^6$ Pa) | 1.1 | 7.2 | 100 | 0.6 |
|  | Swelling ratio ≤ 40 percent | 39 | 10 | 12 | 44 |
| Evaluation | Abrasion resistance | A | A | C | A |
|  | Blocking resistance | B | A | A | C |
|  | Storage stability | B | A | B | C |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An ink comprising:
a coloring material;
an acrylic resin particle comprising a second structure unit B represented by the following Chemical formula 1,

Chemical formula 1 where R represents a hydrogen atom or a methyl group, and A represents a linear alkyl group having 1 to 10 carbon atoms;
an organic solvent; and
water,
wherein a solid dry film of the ink has a breaking elongation ratio of 50 percent or more, a storage elastic modulus G' of $1.0 \times 10^6$ Pa or more at 50 degrees C., and a swelling ratio of 40 percent or less to ethylacetate.

2. The ink according to claim 1, wherein the acrylic resin particle further comprises a first structure unit A represented by the following Chemical structure 1, and a third structure unit C represented by the following Chemical structure 2, Chemical structure 1

Chemical structure 2 where B represents —CH$_2$CH(CH$_2$CH$_3$) CH$_2$CH$_2$CH$_2$CH$_3$.

3. The ink according to claim 2, wherein the acrylic resin particle comprises the first structure unit A in an amount of from 40 to 60 percent by mass, the second structure unit B in an amount of 20 to 30 percent by mass, and the third structure unit C in an amount of from 10 to 40 percent by mass, wherein a mass ratio of the first structure unit A to the second structure unit B is from 2 to 3.

4. The ink according to claim 1, wherein the organic solvent comprises 1,2-hexane diol or 1,2-propane diol.

5. The ink according to claim 1, wherein the organic solvent comprises 1,2-hexane diol and one member selected from the group consisting of 1,2-propane diol, 1,3-butane diol, and 1,3-propane diol.

6. A method of manufacturing the acrylic resin particle in the ink of claim 2, comprising:
reacting styrene as a monomer A forming the first structure unit A, (meth)acrylate as a monomer B forming the second structure unit B, and 2-ethylhexyl acrylate as a monomer C forming the third structure unit C.

7. A printing method comprising:
attaching the ink of claim 1 to a recording medium; and drying the recording medium to which the ink has been attached at 100 degrees C. or higher.

8. The printing method according to claim 7, wherein the ink is discharged in the attaching.

9. An ink accommodating unit comprising:
a container; and
the ink of claim 1 contained in the container.

10. An inkjet printing device comprising:
a discharging device configured to discharge an ink; and
the ink accommodating unit of claim 9.

11. An ink, comprising:
a coloring material;
an acrylic resin particle comprising a third structure unit C represented by the following Chemical structure 2 in an amount of from 20 to 40 percent by mass, Chemical structure 2 where B represents —CH$_2$CH(CH$_2$CH$_3$) CH$_2$CH$_2$CH$_2$CH$_3$;
an organic solvent and
water,
wherein a solid dry film of the ink has a breaking elongation ratio of 50 percent or more, a storage elastic modulus G' of 1.0×10$^6$ Pa or more at 50 degrees C., and a swelling ratio of 40 percent or less to ethylacetate.

12. The ink according to claim 11, wherein the acrylic resin particle comprises the third structure unit C in an amount of from 30 to 40 percent by mass.

13. The ink according to claim 11, wherein the acrylic resin particle further comprises a first structure unit A represented by the following Chemical structure 1, and a second structure unit B represented by the following Chemical formula 1, such that a mass ratio of the first structure unit A to the second structure unit B is from 2 to 3:

Chemical structure 1

Chemical formula 1 where R represents a hydrogen atom or a methyl group, and A represents a linear alkyl group having 1 to 10 carbon atoms.

* * * * *